US009424741B2

(12) United States Patent
Ribarich

(10) Patent No.: US 9,424,741 B2
(45) Date of Patent: Aug. 23, 2016

(54) COMBINED SENSE SIGNAL GENERATION AND DETECTION

(71) Applicant: Infineon Technologies Americas Corp., El Segundo, CA (US)

(72) Inventor: Thomas J. Ribarich, Laguna Beach, CA (US)

(73) Assignee: Infineon Technologies Americas Corp., El Segundo, CA (US)

( * ) Notice: Subject to any disclaimer, the term of this patent is extended or adjusted under 35 U.S.C. 154(b) by 295 days.

(21) Appl. No.: 14/155,739

(22) Filed: Jan. 15, 2014

(65) Prior Publication Data

US 2014/0210519 A1 Jul. 31, 2014

Related U.S. Application Data

(60) Provisional application No. 61/758,220, filed on Jan. 29, 2013.

(51) Int. Cl.
*H04L 7/033* (2006.01)
*G08C 19/02* (2006.01)

(52) U.S. Cl.
CPC .................................... *G08C 19/02* (2013.01)

(58) Field of Classification Search
CPC ...................................................... G08C 19/02
USPC ............ 327/98, 50–54, 56, 58, 60, 72–74, 77
See application file for complete search history.

(56) References Cited

U.S. PATENT DOCUMENTS 5,949,229 A * 9/1999 Choi .................. H02M 1/4225 323/222
6,946,819 B2 * 9/2005 Fagnani ............. H02M 1/4225 323/207

* cited by examiner

*Primary Examiner* — Lincoln Donovan
*Assistant Examiner* — Thomas Skibinski
(74) *Attorney, Agent, or Firm* — Slater Matsil, LLP

(57) ABSTRACT

In an exemplary implementation, a detection circuit for regulating a power converter is configured to receive a combined sense signal comprising a first sense signal from the power converter superimposed with a second sense signal from the power converter. The detection circuit is further configured to generate a first detect signal from the combined sense signal and generate a second detect signal from the combined sense signal. The first detect signal can correspond to the first sense signal and the second detect signal can correspond to the second sense signal. The detection circuit can generate a filtered signal corresponding to the first sense signal from the combined sense signal to generate the first detect signal from the combined sense signal. Also, the detection circuit can generate an offset signal based on the combined sense signal to generate the second detect signal from the combined sense signal.

20 Claims, 4 Drawing Sheets

COMBINED SENSE SIGNAL GENERATION AND DETECTION

BACKGROUND

The present application claims the benefit of and priority to U.S. Provisional Patent Application Ser. No. 61/758,220, filed on Jan. 29, 2013 and entitled "Dual Signal Summing and Detection Circuit." The disclosure of this provisional application is hereby incorporated fully by reference into the present application.

In many applications, it is desirable to sense, or measure, current and/or voltage in a circuit. For example, current can be sensed to provide overcurrent or undercurrent protection to a circuit. Similarly, voltage can be sensed to provide overvoltage or undervoltage protection to a circuit. In power converter applications, current and/or voltage can be sensed to regulate the power output of a circuit.

Voltage can be measured using a resistive voltage divider that divides a higher voltage down to a lower voltage. The lower voltage may be more suitable for processing a sense signal. Current can he measured using a current sensing resistor, where current flowing through the current sensing resistor produces a proportional voltage across the current sensing resistor. In certain applications, it may be desirable to implement robust sensing capabilities by utilizing multiple sense signals based on various currents and/or voltages of a circuit. In such cases, each sense signal is typically generated and processed separately.

SUMMARY

Combined sense signal generation and detection, substantially as shown in and/or described in connection with at least one of the figures, and as set forth more completely in the claims.

DETAILED DESCRIPTION

Figure 1:
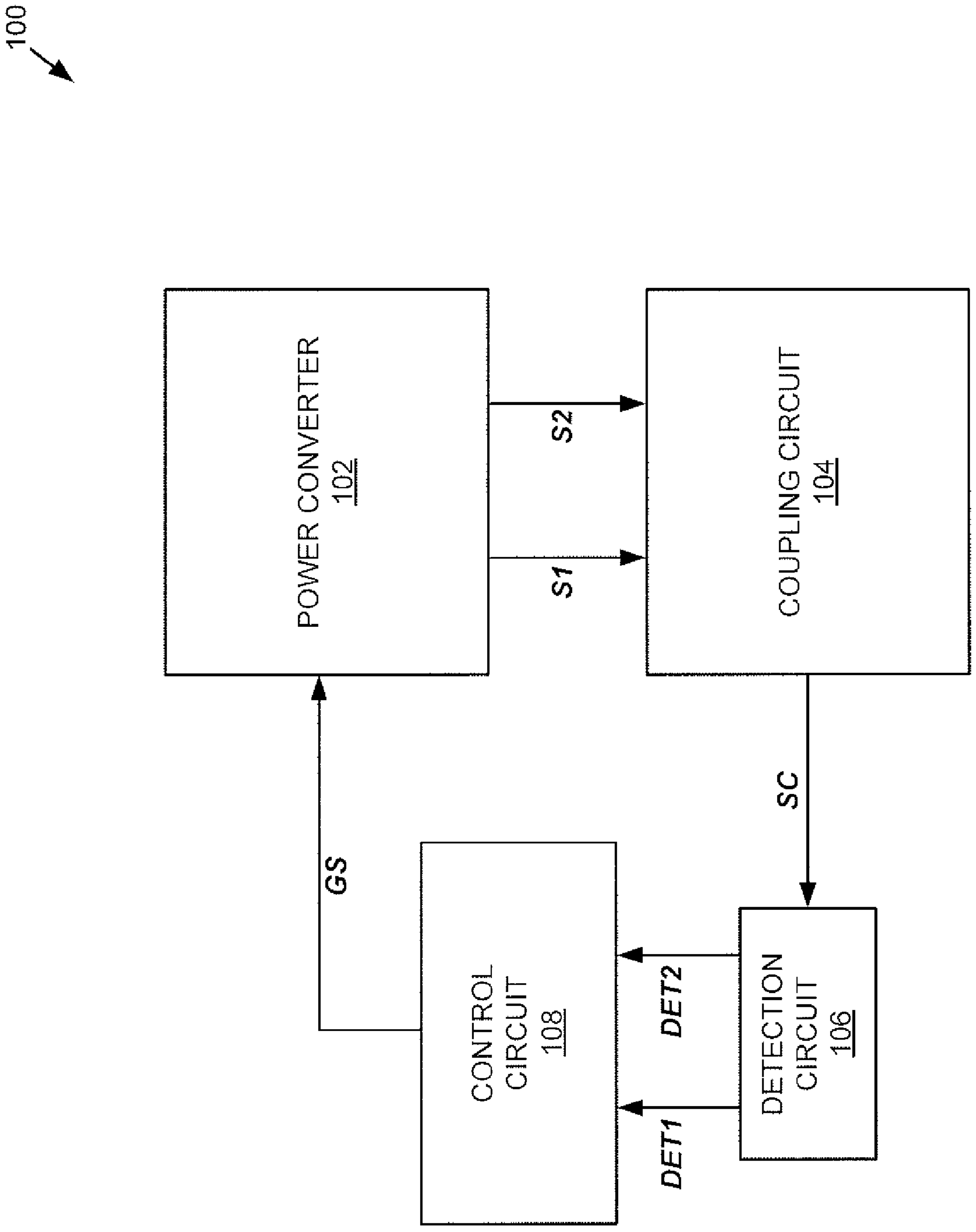
FIG. 1 shows an overview of an exemplary power regulation system, in accordance with one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows an overview of an exemplary power regulation system, in accordance with one implementation of the present disclosure. As shown in FIG. 1, power regulation system 100 includes power converter 102, coupling circuit 104, detection circuit 106, and control circuit 108.

Power converter 102 is providing sense signal S1 and sense signal S2 to coupling circuit 104. Examples of power converter 102 that can provide sense signals S1 and S2 include an alternating current (AC) or direct current (DC) switched-mode power converter, an LED power supply, an electronic ballast circuit, a Class-D audio circuit, a boost converter, a buck converter, a buck/boost converter, a boost/buck converter, a fly-back converter, a resonant converter, a single-ended primary-inductor converter (SEPIC), a single-switch converter, a half-bridge converter, a full-bridge converter, a three-phase converter, or any combination thereof. However, power converter 102 generally corresponds to any circuit or circuits for which it is desirable to sense, or measure, voltage and/or current.

Coupling circuit 104 is producing combined sense signal SC by superimposing sense signal S1 with sense signal S2. Coupling circuit 104 couples sense signal S1 with sense signal S2, such that detection circuit 106 can sense, or measure, each of sense signal S1 and sense signal S2 in combined sense signal SC. Sense signal S1 and sense signal S2 generally correspond to any voltage or current in power converter 102 that may be sensed. Either of sense signal S1 and sense signal S2 (and other sense signals that may be similarly coupled in combined sense signal SC) can be, for example, an alternating current (AC) signal or a direct current (DC) signal. Also, either of sense signal S1 and sense signal S2 (and other sense signals that may be provided in combined sense signal SC) can be, for example, a voltage sense signal or a current sense signal (i.e. for measuring a current or a voltage).

Detection circuit 106 is receiving combined sense signal SC including sense signal S1 from power converter 102, superimposed with sense signal S2 from power converter 102. Detection circuit 106 is generating detect signal DET1 from combined sense signal SC, and is also generating detect signal DET2 from combined sense signal SC. Detect signal DET1 corresponds to sense signal S1 and detect signal DET2 corresponds to sense signal S2. Detection circuit 106 can therefore receive combined sense signal SC and detect parameters of each of sense signal S1 and sense signal S2. For example, detection circuit 106 can sense current of sense signal S1 (e.g. an AC current sense signal) and voltage of sense signal S2 (e.g. DC voltage sense signal). Independent thresholds, comparators, operational amplifiers (OPAMPs), and/or other circuit components, can be utilized for detecting various parameters of each of sense signals S1 and S2, such as peak, average and/or zero-crossing in detection circuit 106.

Control circuit 108 is receiving detect signal DET1 and detect signal DET2 from detection circuit 106 and is further optionally regulating power converter 102 based on at least one of detect signals DET1 and DET2. More particularly, control circuit 108 is generating control signal GS for power converter 102 based on at least one of detect signals DET1 and DET2. Power regulation system 100 can therefore optionally include a feedback loop in which at least one of sense signals S1 and S2 are utilized as feedback signals for power converter 102.

As examples, control circuit 108 can regulate current and/or voltage in power converter 102 in response to detect signal DET1 and/or detect signal DET2. Control circuit 108 can also control power converter 102 in response to an overvoltage condition or an undervoltage condition based on detect signal DET1 and/or detect signal DET2. Furthermore, control circuit 108 can control power converter 102 in response to an overcurrent condition or an undercurrent condition based on detect signal DET1 and/or detect signal DET2. Control circuit 108 can be provided on a microcontroller or otherwise. Although detect signals DET1 and DET2 are utilized by control circuit 108, other circuits may utilize either of detect signals DET1 and DET2 instead of or in addition to control circuit 108.

By producing combined sense signal SC by superimposing at least sense signal S1 with sense signal S2, sense signal S1 and sense signal S2 are coupled into a single circuit node. Thus, sense signal S1 and sense signal S2 can be processed together, thereby enhancing flexibility in circuit design.

Figure 2A:
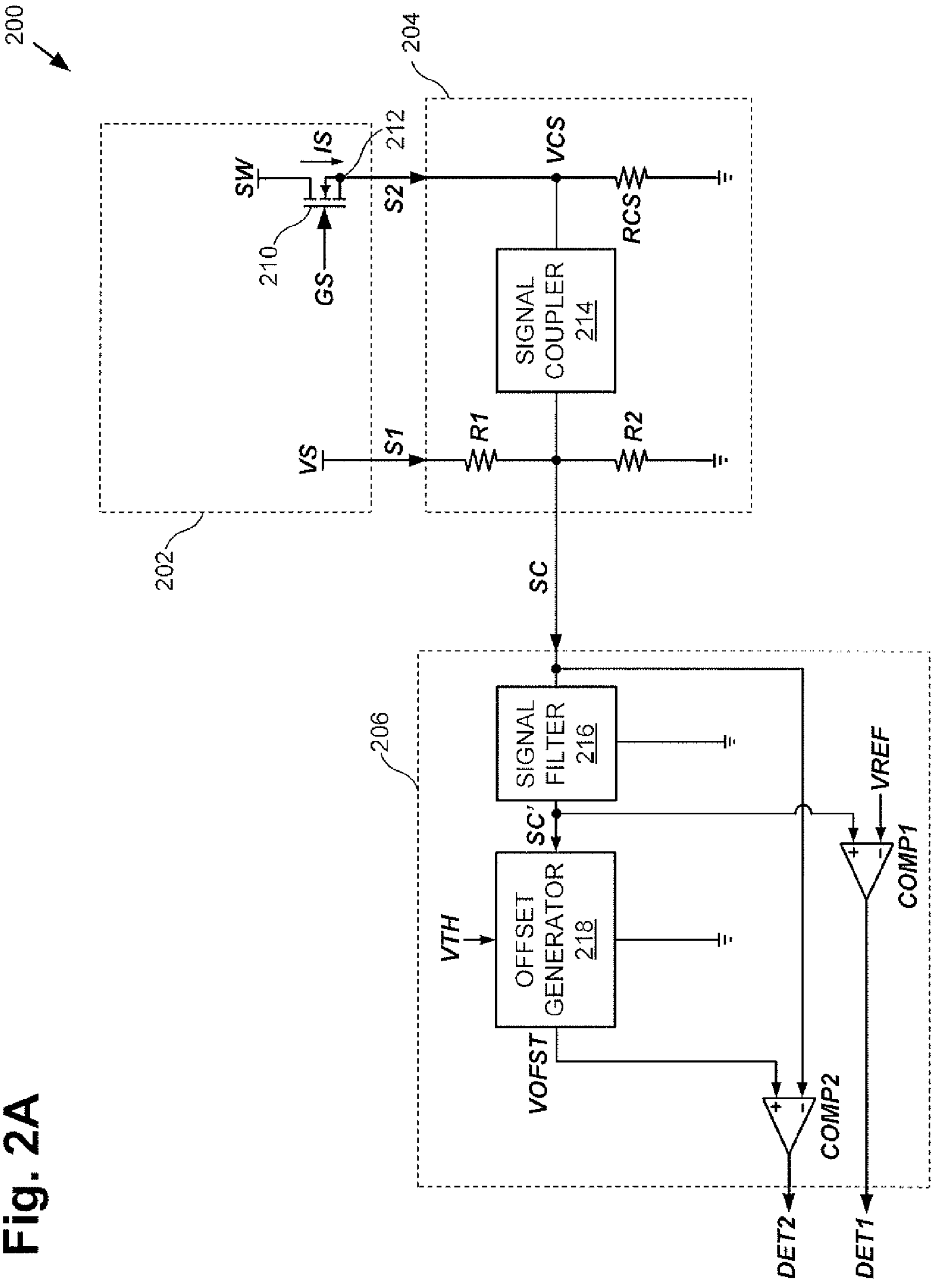
FIG. 2A presents a circuit schematic of an exemplary power regulation system, in accordance with one implementation of the present disclosure.

Referring now to FIG. 2A, FIG. 2A presents a circuit schematic of an exemplary power regulation system, in accordance with one implementation of the present disclosure. In FIG. 2A, power regulation system 200 corresponds to power regulation system 100 in FIG. 1. FIG. 2A shows power converter 202, coupling circuit 204, and detection circuit 206 corresponding to power converter 102, coupling circuit 104, and detection circuit 106 in FIG. 1.

FIG. 2A shows exemplary portions of power converter 202, which includes power switch 210, sensed voltage VS, switched voltage SW, and sensed current IS, amongst other features not specifically shown. Examples of power switch 210 include a bipolar junction transistor (BJT), a metal-oxide-semiconductor field-effect-transistor (MOSFET), an insulated-gate bipolar transistor (IGBT), and a high-electron-mobility transistor (HEMT). Power switch 210 can be an enhancement mode or depletion mode device and can be a group III-V transistor, such as a silicon transistor, or a group III-Nitride transistor, such as a GaN transistor. Power converter 202 can optionally include additional power switches depending on the particular topology employed. Under regular operation, a control circuit, such as control circuit 108 may be switching power switch 210 and/or other power switches in power converter 202 at a frequency of approximately 100 kHz or higher, by way of example.

In power regulation system 200, sense signal S1 is provided from sense voltage VS and sense signal S2 is provided from terminal 212 of power switch 210 of power converter 202. Terminal 212 is a source terminal in the present implementation, but can be a drain terminal in other implementations. Sensed voltage VS can correspond to an input voltage of power converter 202 (commonly referred to as VIN), an output voltage of power converter 202 (commonly referred to as VOUT), and generally any voltage being sensed in power regulation system 200 (e.g. a DC voltage). It is noted that where sensed voltage VS is a DC voltage, it may have some nominal ripple.

Sensed current IS can correspond generally to any current being sensed in power regulation system 200 (e.g. alternating current). As shown, control signal GS, corresponding to control signal GS of FIG. 1, is for power switch 210 of power converter 202. Thus, control circuit 108 of FIG. 1 can regulate current and/or voltage of power converter 202 by controlling switching of power switch 210 utilizing control signal GS (e.g. a gate signal). It is noted that control signal GS may control other devices in power converter 202 instead of or in addition to power switch 210.

Coupling circuit 204 includes voltage divider resistors R1 and R2, current sensing resistor RCS (a shunt resistor), and signal coupler 214. Voltage divider resistors R1 and R2 are part of a resistive voltage divider that divides sensed voltage VS down to a lower voltage. The lower voltage may be more suitable for processing sense signal S1 in detection circuit 206. However, it may not be necessary to utilize a resistive voltage divider, and furthermore, other techniques may be employed for processing sense signal S1. Sensed voltage VS can be, for example, greater than approximately 48 volts and can be divided down to less than approximately 20 volts. The lower voltage constitutes a DC offset voltage, which is connected to signal coupler 214.

Sensed current IS can be measured using current sensing resistor RCS, where current flowing through current sensing resistor RCS produces current sense voltage VCS, which is proportional to sensed current IS, across current sensing resistor RCS. Current sensing resistor RCS is placed between power switch 210 (e.g. a power switch of a power supply) and ground. Current sense voltage VCS is between power switch 210 and current sensing resistor RCS, and is connected to signal coupler 214.

Figure 2B:
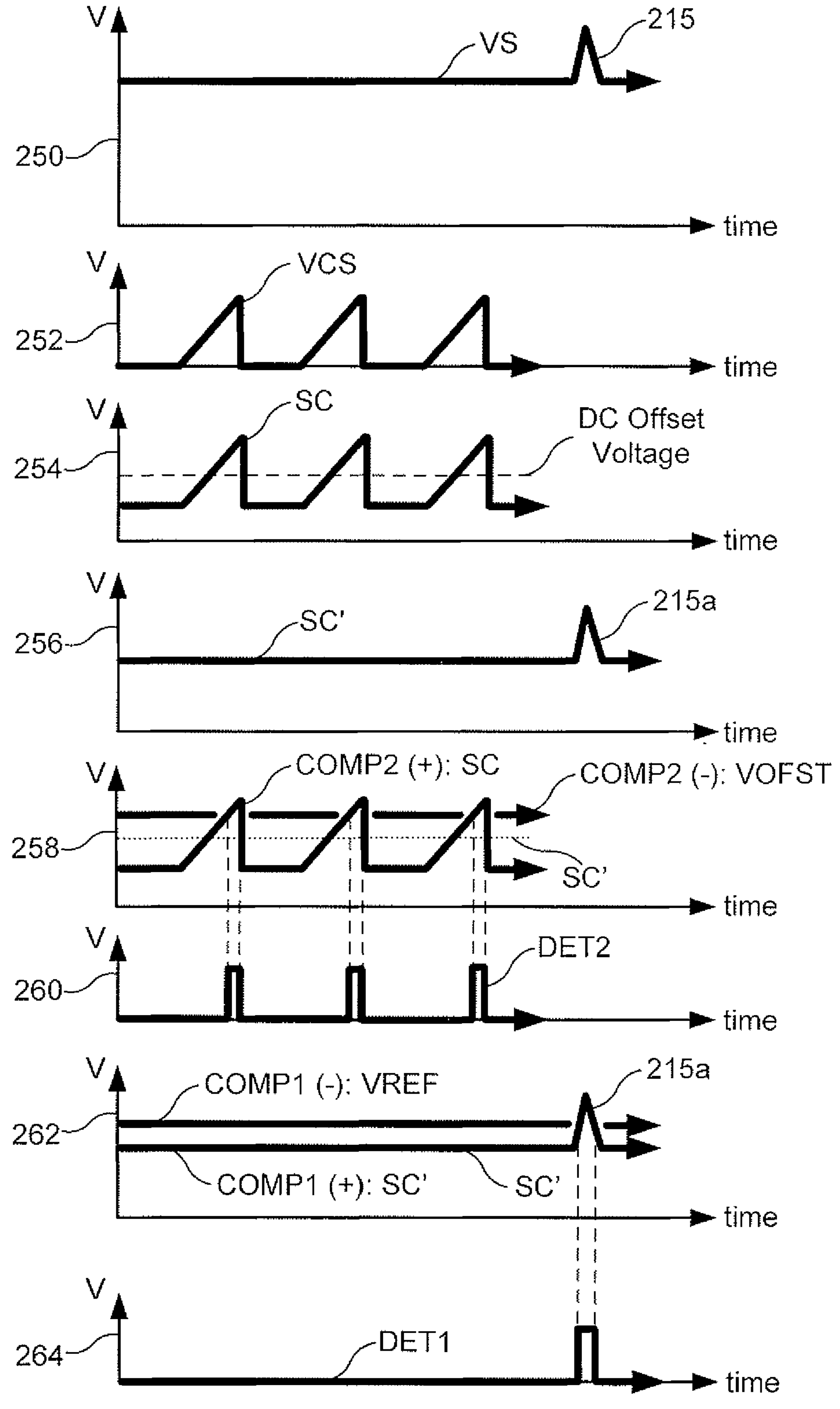
FIG. 2B presents waveform graphs of an exemplary power regulation system, in accordance with one implementation of the present disclosure.

Signal coupler 214 is configured to produce combined sense signal SC by superimposing current sense voltage VCS with the DC offset voltage provided by the resistive voltage divider, which is illustrated by FIG. 2B. Referring to FIG. 2B with FIG. 2A, FIG. 2B presents waveform graphs of an exemplary power regulation system, in accordance with one implementation of the present disclosure. Waveform graph 250 shows sensed voltage VS, which is a DC voltage and includes voltage spike 215 for illustrative purposes. Waveform graph 252 shows current sense voltage VCS, which is an AC voltage. Waveform graph 254 shows combined sense voltage SC along with a DC offset voltage corresponding to the DC offset voltage provided by the resistive voltage divider. As can be see in waveform graph 254, combined sense signal SC substantially corresponds to current sense voltage VCS summed with the DC offset voltage.

Figure 2C:
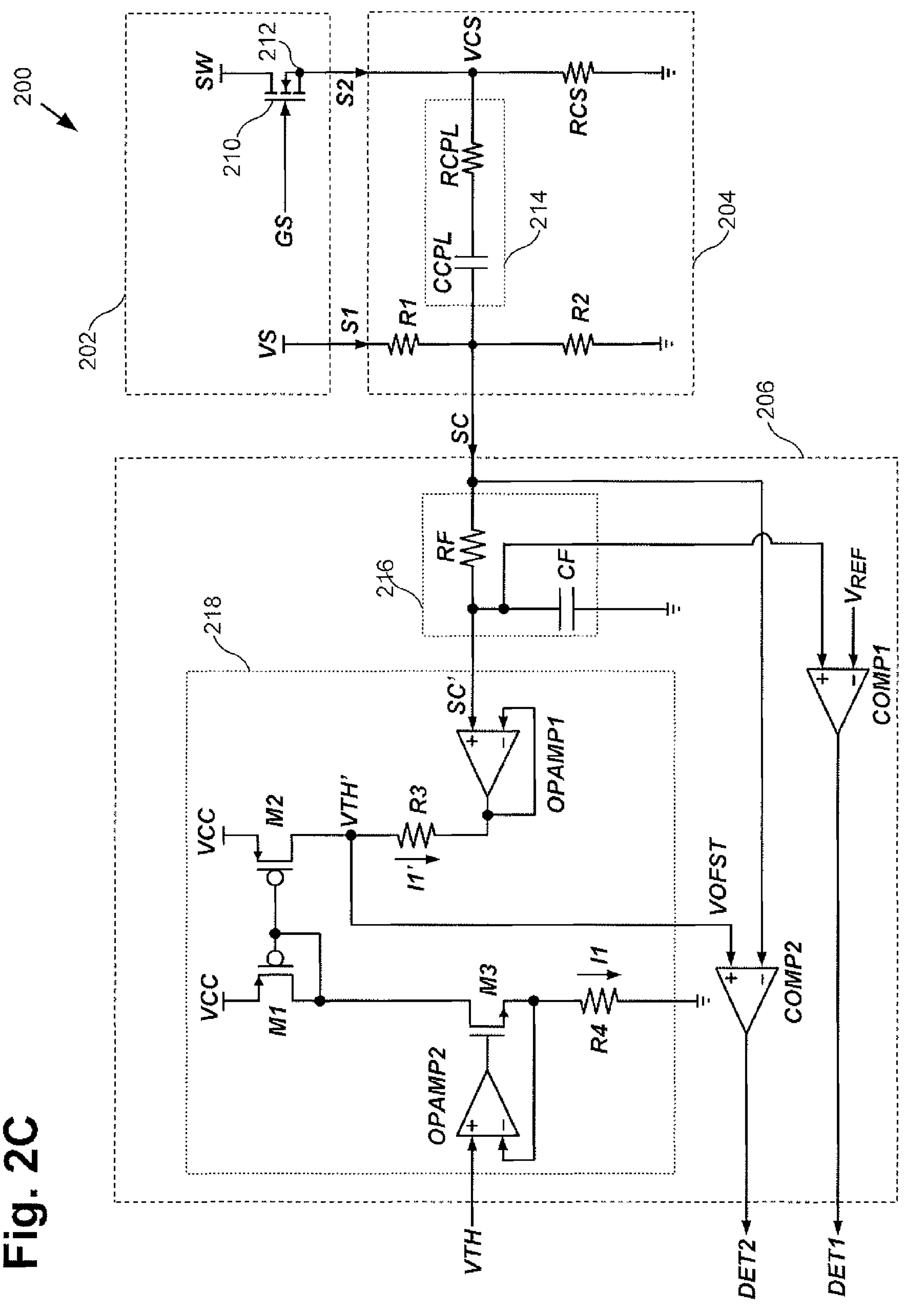
FIG. 2C presents a circuit schematic of an exemplary power regulation system, in accordance with one implementation of the present disclosure.

FIG. 2C presents a circuit schematic of an exemplary power regulation system, in accordance with one implementation of the present disclosure. The exemplary power regulation system of FIG. 2C represents one specific implementation of the exemplary power regulation system of FIG. 2A. In FIG. 2C, signal coupler 214 is implemented utilizing a resistor capacitor (RC) circuit having coupling resistor RCPL and coupling capacitor CCPL, which are series connected. By way of example, RCPL can be approximately 1000 ohms and CCPL can be approximately 100 nF. Generally, the corner frequency of signal coupler 214 should be lower than the switching frequency of power switch 210. Signal coupler 214 can be implemented in many different ways, and may be altered depending upon, for example, the capabilities or requirements of detection circuit 206 and the form of sense signals S1 and S2 or any signals derived therefrom. In one implementation, signal coupler 214 is implemented utilizing a diode. In another implementation, current sensing resistor RCS, coupling capacitor CCPL, and coupling resistor RCPL are replaced by a winding of a transformer. The winding may be a primary winding of the transformer and a secondary winding of the transformer which may be coupled between voltage divider resistors R1 and R2.

In FIG. 2A, detection circuit 206 includes signal filter 216, offset generator 218, comparator COMP1, and comparator COMP2. Signal Filter 216 is configured to receive combined sense signal SC from coupling circuit 204 and is further configured to generate filtered signal SC' from combined sense signal SC. Filtered signal SC' corresponds to sense signal S1 and is utilized to generate detect signal DET1 from combined sense signal SC. Referring to FIG. 2B with FIG. 2A, waveform graph 256 shows filtered signal SC', which corresponds to the DC offset voltage generated by the resistive voltage divider and shown in waveform graph 254. Thus, it can be seen that signal filter 216 is configured to filter the AC component of sense signal S2 (e.g. of current sense voltage VCS) from combined sense signal SC. FIG. 2C shows signal filter 216 being implemented as a low-pass RC filter including filter resistor RF and filter capacitor CF.

As filtered signal SC' corresponds to sense signal S1, it may be utilized to sense, or measure, sensed voltage VS. Filtered signal SC' can be utilized in various ways depending on which parameters of sense signal S1 are being sensed. FIGS. 2A and 2C illustrate one specific example where detection circuit 206 is configured to generate detect signal DET1 utilizing a comparison based on reference signal VREF and filtered signal SC' that is generated from combined sense signal SC and corresponds to sense signal S1. Such an approach can be utilized to sense overvoltage or undervoltage conditions in power regulation system 200. As shown, the inverting input of comparator COMP1 is configured to receive reference voltage VREF while the non-inverting input of comparator COMP1 is configured to receive filtered signal SC'.

Referring to FIG. 2B with FIG. 2A, waveform graph 250 shows voltage spike 215 in sensed voltage VS. Voltage spike 215 of sensed signal VS represents an overvoltage condition in power regulation system 200. Waveform graph 262 illustrates voltage spike 215*a* of filtered signal SC', which corresponds to voltage spike 215 in sensed voltage VS. Thus, voltage spike 215 can be detected based on voltage spike 215*a* in filtered signal SC'. As shown in waveform graph 264, comparator COMP1 is configured to generate detect signal DET1 having a first logic state when filtered signal SC' exceeds reference voltage VREF and a second logic state when filtered signal SC' does not exceed reference voltage VREF. The logic states can be indicative of an overvoltage condition or an undervoltage condition. For example, the first logic state is indicative of an overvoltage condition in the implementation shown.

Control circuit 108 can therefore utilize detect signal DET1 to control power converter 102 in response to an overvoltage condition or an undervoltage condition based on detect signal DET1. However, it is noted that in other implementations, detect signal DET1 may be utilized in other ways (and not necessarily by control circuit 108) and furthermore, filtered signal SC' may be utilized in detecting sensed signal VS without employing a comparator.

In FIG. 2A, offset generator 218 is configured to generate offset signal VOFST based on combined sense signal SC to generate detect signal DET2 from combined sense signal SC. As shown in waveform graph 258 of FIG. 2B, offset signal VOFST corresponds to a threshold voltage, which can correspond to threshold voltage VTH in FIG. 2A, offset by filtered signal SC'. As filtered signal SC' is based on combined sense signal SC, offset signal VOFST is also based on combined sense signal SC. Therefore, offset signal VOFST can be utilized to compensate for a component of combined sense signal SC corresponding to sense signal S1 (e.g. filtered signal SC') in generating detect signal DET2. In the implementation shown, that component is the DC voltage component of combined sense signal SC, which corresponds to sense signal S1, as signal filter 216 filters out the AC component of combined sense signal SC, corresponding to sense signal S2. Sense signal S1 is therefore substantially canceled out in the comparison utilizing comparator COMP2 so as to accurately generate detect signal DET2.

FIG. 2C shows one implementation of offset generator 218. Offset generator 218 includes operational amplifiers OPAMP1 and OPAMP2, resistors R3 and R4, and transistors M1, M2, and M3. Operational amplifier OPAMP2, resistor R4, and transistor M3 form a voltage to current converter for generating current 11 from threshold voltage VTH. Transistors M1 and M2 form a current mirror powered by supply voltage VCC that mirrors current I1 to generate current I1', which along with resistor R3 generates threshold voltage VTH'. Threshold voltage VTH' can be approximately equal to threshold voltage VTH and is summed with filtered signal SC' to generate offset signal VOFST. Filtered signal SC' is provided by operational amplifier OPAMP1. Operational amplifier OPAMP1 is configured to buffer filtered signal SC' and is optionally a unity gain buffer, as shown.

Comparator COMP2 is configured to generate detect signal DET2 utilizing a comparison based on combined sense signal SC, threshold voltage VTH, and filtered signal SC' that is generated from combined sense signal SC and corresponds to sense signal S1. As shown, the inverting input of comparator COMP2 is configured to receive combined sense signal SC, while the non-inverting input of comparator COMP2 is configured to receive offset signal VOFST.

Referring to FIG. 2B with FIG. 2A, waveform graph 258 shows combined sense signal SC and offset signal VOFST. Comparator COMP2 is configured to generate detect signal DET2 having a first logic state when combined sense signal SC exceeds offset signal VOFST and a second logic state when combined sense signal SC does not exceed offset signal VOFST. Waveform graph 260 of FIG. 2B shows that detect signal DET2 has the same frequency as combined sense signal SC (and sense signal S2) and therefore corresponds to sensed current IS. Control circuit 108 can therefore utilize detect signal DET2 to control power converter 102 in response to an overcurrent condition or an undercurrent condition, or otherwise, based on detect signal DET2.

It is noted that in other implementations, detect signal DET2 may be utilized in other ways (and not necessarily by control circuit 108) and furthermore, the component of combined sense signal SC corresponding to sense signal S1 (e.g. filtered signal SC') may be compensated for in generating detect signal DET2 utilizing different approaches than shown. Also, sensed current IS may be detected without employing a comparator.

FIGS. 2A, 2B, and 2C emphasize implementations that employ a voltage-based approach to generating combined sense signal SC and detecting sense signals S1 and S2. However, a current based approach can also be employed. Furthermore, while signal coupler 214 is utilized to superimpose a DC signal (i.e. the DC offset signal) with an AC signal (current sense voltage VCS), the DC signal may instead be another AC signal. For example, the AC signal can have a different frequency than the another AC signal, such that signal filter 216 can filter out one of the AC signals. It will therefore be appreciated that power regulation system 200 is illustrative and many other approaches to signal coupling and detection can he employed.

Thus, as described above with respect to FIGS. 1, 2A, 2B, and 2C, implementations of the present disclosure provide for generation of a combined sense signal from at least first and second sense signals. The at least first and second sense signals can be independently detected from the combined sense signal. As such, the at least first and second sense signals can be processed together as the combined sense signal, thereby enhancing flexibility in circuit design.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A detection circuit for regulating a power converter, said detection circuit configured to:

receive a combined sense signal comprising a first sense signal from said power converter, superimposed with a second sense signal from said power converter;

generate a first detect signal by a first comparator based on said combined sense signal;

generate a second detect signal by a second comparator based on said combined sense signal.

2. The detection circuit of claim 1, wherein said first detect signal corresponds to said first sense signal.

3. The detection circuit of claim 1, wherein said second detect signal corresponds to said second sense signal.

4. The detection circuit of claim 1 configured to generate a filtered signal corresponding to said first sense signal from said combined sense signal to generate said first detect signal from said combined sense signal.

5. The detection circuit of claim 1 configured to generate an offset signal based on said combined sense signal to generate said second detect signal from said combined sense signal.

6. The detection circuit of claim 1 configured to generate said second detect signal utilizing an offset signal to compensate for a component of said combined sense signal corresponding to said first sense signal.

7. The detection circuit of claim 1 configured to generate said first detect signal utilizing a comparison based on a reference signal and a filtered signal that is generated from said combined sense signal and corresponds to said first sense signal.

8. The detection circuit of claim 1 configured to generate said second detect signal utilizing a comparison based on said combined sense signal, a threshold voltage, and a filtered signal that is generated from said combined sense signal and corresponds to said first sense signal.

9. The detection circuit of claim 1, wherein said first sense signal is a direct current (DC) signal.

10. The detection circuit of claim 1, wherein said first sense signal is an alternating current (AC) signal.

11. A power regulation system comprising:

a power converter providing a first sense signal and a second sense signal;

a coupling circuit producing a combined sense signal by superimposing said first sense signal with said second sense signal;

a detection circuit generating a first detect signal by a first comparator based on said combined sense signal, and a second detect signal by a second comparator based on said combined sense signal.

12. The power regulation system of claim 11 further comprising a control circuit regulating said power converter based on at least one of said first and second detect signals.

13. The power regulation system of claim 11 wherein said first detect signal corresponds to said first sense signal and said second detect signal corresponds to said second sense signal.

14. The power regulation system of claim 11 further comprising a control circuit generating a control signal for a power switch of said power converter based on at least one of said first and second detect signals.

15. The power regulation system of claim 11 further comprising a control circuit controlling said power converter in response to an overvoltage condition or an undervoltage condition based on said first detect signal.

16. The power regulation system of claim 11 further comprising a control circuit controlling said power converter in response to an overcurrent condition or an undercurrent condition based on said second detect signal.

17. A power regulation system comprising:

a power converter providing a first sense signal and a second sense signal;

a coupling circuit producing a combined sense signal by superimposing said first sense signal with said second sense signal;

a detection circuit generating a first detect signal by a first comparator based on said combined sense signal, and a second detect signal by a second comparator based on said combined sense signal;

wherein said first sense signal is a DC signal.

18. The power regulation system of claim 17, wherein said second sense signal is an AC signal.

19. The power regulation system of claim 17, wherein said second sense signal is provided from a terminal of a power switch of said power converter.

20. The power regulation system of claim 17, wherein said power converter is a switched-mode power converter.

* * * * *